United States Patent [19]
Drnevich

[11] Patent Number: 6,152,984
[45] Date of Patent: Nov. 28, 2000

[54] INTEGRATED DIRECT REDUCTION IRON SYSTEM

[75] Inventor: Raymond Francis Drnevich, Clarence Center, N.Y.

[73] Assignee: Praxair Technology, Inc., Danbury, Conn.

[21] Appl. No.: 09/150,245

[22] Filed: Sep. 10, 1998

[51] Int. Cl.[7] ................................................ C21B 13/14
[52] U.S. Cl. .............................. 75/505; 75/958; 266/160
[58] Field of Search ............................. 266/160; 75/958, 75/505

[56] References Cited

U.S. PATENT DOCUMENTS

| | | | |
|---|---|---|---|
| 4,201,571 | 5/1980 | Scarlett et al. ............................... | 75/35 |
| 4,234,169 | 11/1980 | Scarlett et al. ........................... | 266/156 |
| 4,336,063 | 6/1982 | Guzmán-Bofill et al. ................... | 75/35 |
| 4,363,654 | 12/1982 | Frederick et al. ........................... | 75/34 |
| 4,370,162 | 1/1983 | Dominguez-Ahedo et al. ........... | 75/90 |
| 4,678,480 | 7/1987 | Heinrich et al. .......................... | 48/197 |
| 4,861,369 | 8/1989 | von Bogdandy et al. ................... | 75/38 |
| 5,064,467 | 11/1991 | Dam et al. ................................. | 75/495 |
| 5,081,845 | 1/1992 | Allam et al. ................................ | 62/24 |
| 5,117,623 | 6/1992 | Arundale ................................ | 60/39.05 |
| 5,317,862 | 6/1994 | Rathbone .................................. | 75/958 |
| 5,421,166 | 6/1995 | Allam et al. ................................ | 62/24 |
| 5,630,862 | 5/1997 | Greenwalt .................................. | 75/958 |
| 5,722,259 | 3/1998 | Sorensen et al. ......................... | 62/646 |

Primary Examiner—Melvyn Andrews
Attorney, Agent, or Firm—Donald T. Black

[57] ABSTRACT

A system for producing directly reduced iron integrated with a turbine power generator and preferably a cryogenic air separation plant wherein off-gas from the direct reduction drives the turbine and preferably oxygen from the air separation plant is used to generate synthesis gas for the direct reduction and nitrogen from the air separation plant dampens NOx generation and augments power generation in the turbine.

10 Claims, 5 Drawing Sheets

INTEGRATED DIRECT REDUCTION IRON SYSTEM

TECHNICAL FIELD

This invention relates to the production of iron by the direct reduction of iron ore and provides an improvement whereby the direct reduction of iron ore is effectively integrated with the generation of power. Preferably the integration also includes an air separation plant such as a cryogenic air separation plant.

BACKGROUND ART

Iron ore or iron oxide is directly reduced to metallic iron by contacting the iron ore directly with a reductant. The direct reduction of iron ore to produce metallic iron consumes significant amounts of power, but the optimal geographic location of such direct reduction plants is often in areas where incremental power to operate the plant is not readily and efficiently available.

Accordingly it is an object of this invention to provide a process for the production of iron by the direct reduction of iron ore which can be effectively operated in any geographic location irrespective of the exogenous availability of power at such location.

SUMMARY OF THE INVENTION

The above and other objects, which will become apparent to those skilled in the art upon a reading of this disclosure, are attained by the present invention, one aspect of which is:

A method for producing iron comprising:

(A) generating synthesis gas and passing the synthesis gas into a reactor vessel;

(B) providing iron ore into the reactor vessel and reacting the iron ore with the synthesis gas within the reactor vessel to produce iron and reactor off-gas comprising carbon monoxide, hydrogen, carbon dioxide and water vapor;

(C) recovering iron from the reactor vessel;

(D) removing at least some of the water vapor from the reactor off-gas to produce drier off-gas; and (E) combusting the drier off-gas in a gas turbine to produce power.

Another aspect of the invention is:

Apparatus for producing iron comprising:

(A) a synthesis gas generator and means for passing hydrocarbon fluid into the synthesis gas generator;

(B) a direct reduction reactor vessel, means for passing iron ore into the direct reduction reactor vessel, and means for passing synthesis gas from the synthesis gas generator into the direct reduction reactor vessel;

(C) means for recovering iron from the direct reduction reactor vessel;

(D) a dryer and means for passing gas from the direct reduction reactor vessel to the dryer; and (E) a gas turbine and means for passing gas from the dryer to the gas turbine.

As used herein, the term "synthesis gas" means a mixture comprising carbon monoxide and hydrogen.

As used herein, the term "iron ore" means one or more oxides of iron such as ferric oxide and ferrous oxide.

As used herein, the term "dryer" means equipment which can remove moisture from a gas mixture. The equipment can utilize a material, such as an adsorbent, to remove water vapor from the gas mixture, or heat exchange means, such as a cooler and subsequent phase separator, to remove condensed water from the gas mixture.

As used herein, the term "gas turbine" means a unit that combines an air compressor, combustor and gas expander to generate shaft power from the elevated pressure level combustion of a suitable fuel. Typically the air compressor and gas expander components are mounted on common shafts that can also drive other power-consuming fluid components or an electric generator.

As used herein, the term "feed air" means a mixture comprising primarily oxygen and nitrogen, such as ambient air.

As used herein, the term "air separation plant" means equipment which can separate feed air and produce at least one of oxygen and nitrogen.

As used herein, the term "cryogenic air separation plant" means an air separation plant comprising at least one column wherein at least part of the operation of the column is carried out at temperatures at or below 150 degrees Kelvin (K).

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or packing elements such as structured or random packing.

As used herein, the term "pressure swing adsorption air separation plant" means an air separation plant for carrying out the separation of feed air comprising the principal steps of adsorption, during which a component of feed air is preferentially adsorbed onto the adsorbent, and regeneration or desorption, wherein the preferentially adsorbed component is removed from the adsorbent by a reduction in the pressure.

The numerals in the Figures are the same for the common elements.

DETAILED DESCRIPTION

The invention employs a by product of the direct reduction of iron ore to generate power, and preferably also as recycle to the direct reduction process itself. The power production facilitates the location of the direct reduction plant where power is not readily available and the recycle enhances this facilitation by reducing the power requirements of the direct reduction process. Most preferably the system is also integrated with an air separation plant such as a cryogenic air separation plant, further improving the advantages of the overall arrangement.

Figure 1:
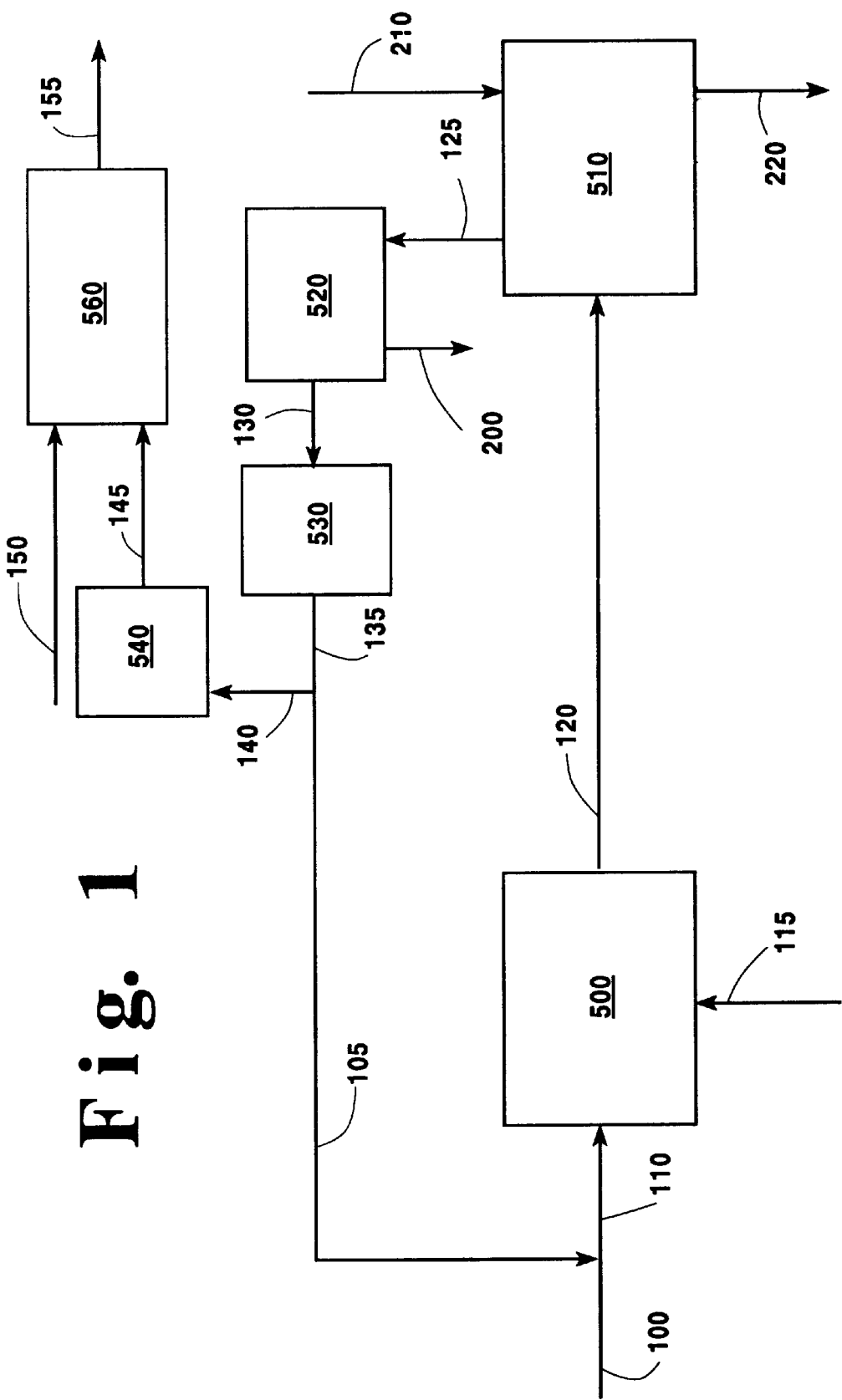
FIG. 1 is a flowsheet diagram of one preferred embodiment of the invention wherein the synthesis gas generator is a reformer.

The invention will be described in detail with reference to the Drawings. Referring now to FIG. 1, hydrocarbon fluid 100, typically and preferably natural gas comprised mainly of methane, but which can be comprised partly or wholly of other light hydrocarbons up to and including vaporized naphtha, is mixed with recycled off-gas 105 to form feed stream 110 which is passed into synthesis generator 500. In the embodiment illustrated in FIG. 1, synthesis gas generator 500 is a reformer. Within reformer 500 carbon dioxide reacts with hydrocarbon in an endothermic reaction to form synthesis gas. Heat may be provided to reformer 500 to drive the endothermic reactions by the combustion of natural gas as shown by element 115. Synthesis gas 120, which includes carbon monoxide and hydrogen generated in synthesis gas generator 500 as well as carbon monoxide and hydrogen recycled from the direct reduction reactor, is passed, preferably as illustrated in FIG. 1 without any cooling beyond that resulting from natural heat transfer, into direct reduction reactor vessel 510.

Iron ore 210 is passed into direct reduction reactor vessel 510 and within vessel 510 the iron ore contacts the hot synthesis gas, which is generally at a temperature within the range of from 1400° F. to 1800° F., and reacts with the synthesis gas. The reaction of the synthesis gas with the iron ore reduces the iron ore to metallic iron and produces carbon dioxide and water vapor. The resulting iron is recovered from direct reduction reactor vessel 510 as shown by stream 220.

Off-gas 125 from direct reduction reactor vessel 150, which comprises carbon dioxide and water vapor from the direct reduction reaction as well as unreacted carbon monoxide and hydrogen, is passed to dryer 520 wherein the off-gas is cooled and at least some of the water vapor in the off-gas from reactor 510 is condensed. The resulting condensed water is removed from dryer 520 as shown by stream 200, and the resulting drier off-gas is passed in stream 130 from dryer 520 to first compressor 530 wherein it is compressed to a pressure generally within the range of from 30 to 300 pounds per square inch absolute (psia). It should be understood that although the off-gas 125 is treated to remove some of its contained water vapor, the resultant drier off-gas 130 in fact still retains some water vapor and may be saturated at the exit conditions from dryer 520.

A portion 105 of resulting compressed off-gas 135 from first compressor 530 is recycled. In the embodiment of the invention illustrated in FIG. 1 portion 105 is recycled to reformer 500. Another portion 140, generally comprising from about 5 to 70 percent of the drier off-gas, is passed to second compressor 540 wherein it is further compressed to a pressure generally within the range of from 150 to 500 psia. The further compressed drier off-gas 145 is then passed into gas turbine 560 wherein it is combusted to produce power. If desired, additional fuel such as natural gas 150, may be provided to gas turbine 560 for augmented power generation. The power produced by gas turbine 560, shown in representational fashion as 155, may be electrical or mechanical. That is, turbine 560 may be used to drive a generator or it may be used to directly drive machinery such as a compressor.

Figure 2:
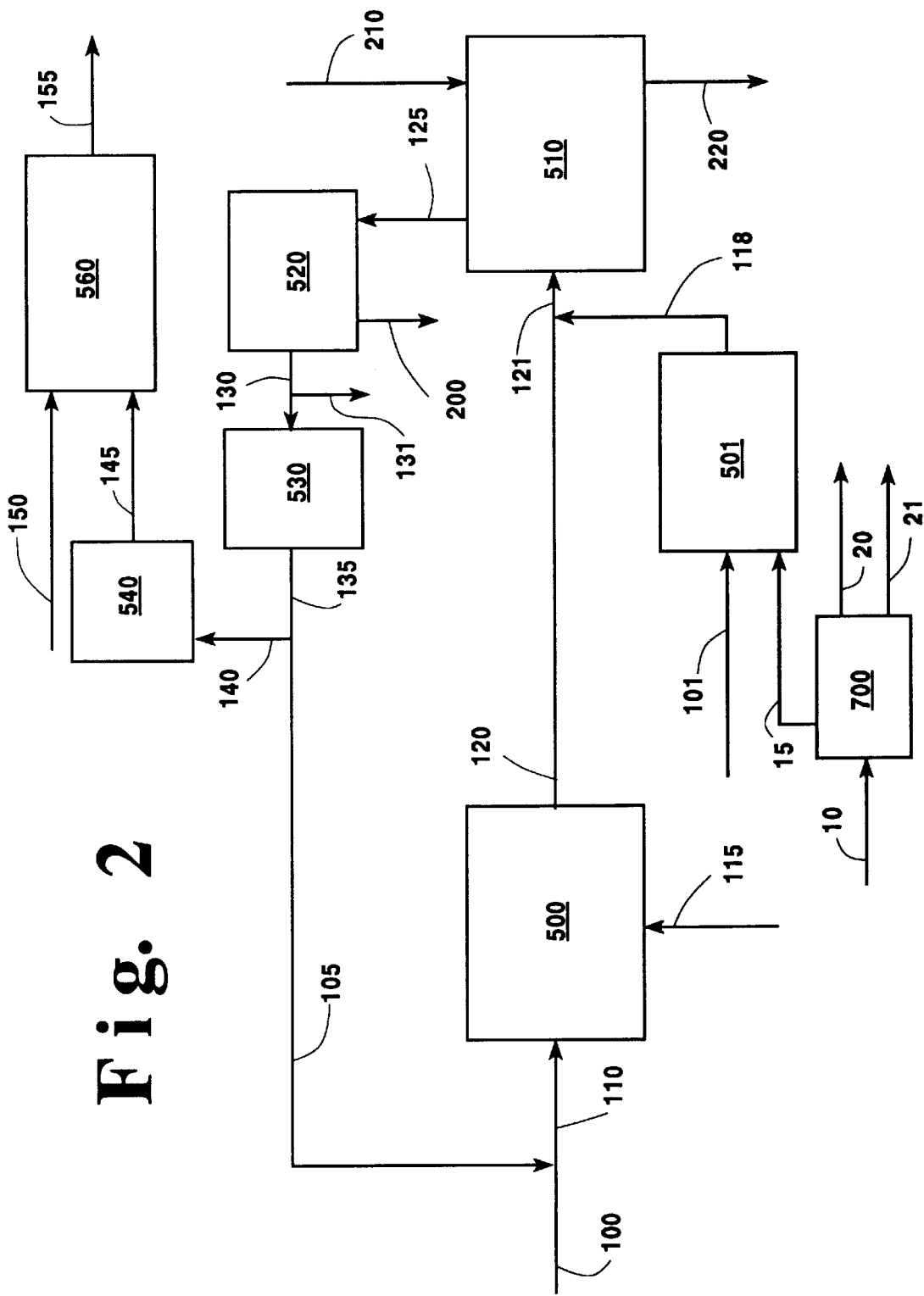
FIG. 2 is a flowsheet diagram of another preferred embodiment of the invention employing two different synthesis gas generators.

FIG. 2 illustrates another embodiment of the invention wherein additional synthesis gas is generated using either a partial oxidation unit or an autothermal unit as a second synthesis gas generator. The elements of the embodiment of the invention illustrated in FIG. 2 which correspond to those of the embodiment illustrated in FIG. 1 are numbered the same and will not be described again in detail.

Referring now to FIG. 2, feed air 10 is passed into air separation plant 700. Preferably air separation plant 700 is a cryogenic air separation plant although it may also be a pressure swing adsorption air separation plant. Within air separation plant 700 the feed air is separated into product oxygen 15 and optionally product nitrogen 20. If the air separation plant is a cryogenic air separation plant, other products such as argon and/or liquid oxygen, represented by product stream 21, may also be produced. Oxygen 15 produced in the air separation plant, having an oxygen concentration of at least 70 mole percent, preferably at least 90 mole percent, is passed into synthesis gas generator 501 along with hydrocarbon fluid 101 which may be characterized the same as the characterization of fluid 100 and generally is from the same source as is hydrocarbon fluid 100.

Synthesis gas generator 501 may be either a partial oxidation unit or an autothermal unit. In a partial oxidation unit, the oxygen reacts with the hydrocarbon fluid to produce carbon monoxide and hydrogen. In an autothermal unit there is also produced carbon monoxide and hydrogen by the partial oxidation of hydrocarbon with oxygen from the air separation plant, although to a lesser extent than in the partial oxidation unit, and, additionally, steam is provided into the autothermal unit to generate additional carbon monoxide and hydrogen via a steam-hydrocarbon reformation process. The synthesis gas generated in synthesis gas generator 501 is then passed into direct reduction reactor vessel 510. Preferably as illustrated in FIG. 2, synthesis gas from generator 501 is passed in stream 118 into stream 120 to form combined stream 121 for passage into reactor vessel 510. The remainder of the system illustrated in FIG. 2 is similar to that illustrated in FIG. 1. If desired, a portion of drier off-gas 130, shown as stream 131, may be taken and used elsewhere in the process, for example as a source of fuel to generate heat for use in reformer 500.

Figure 3:
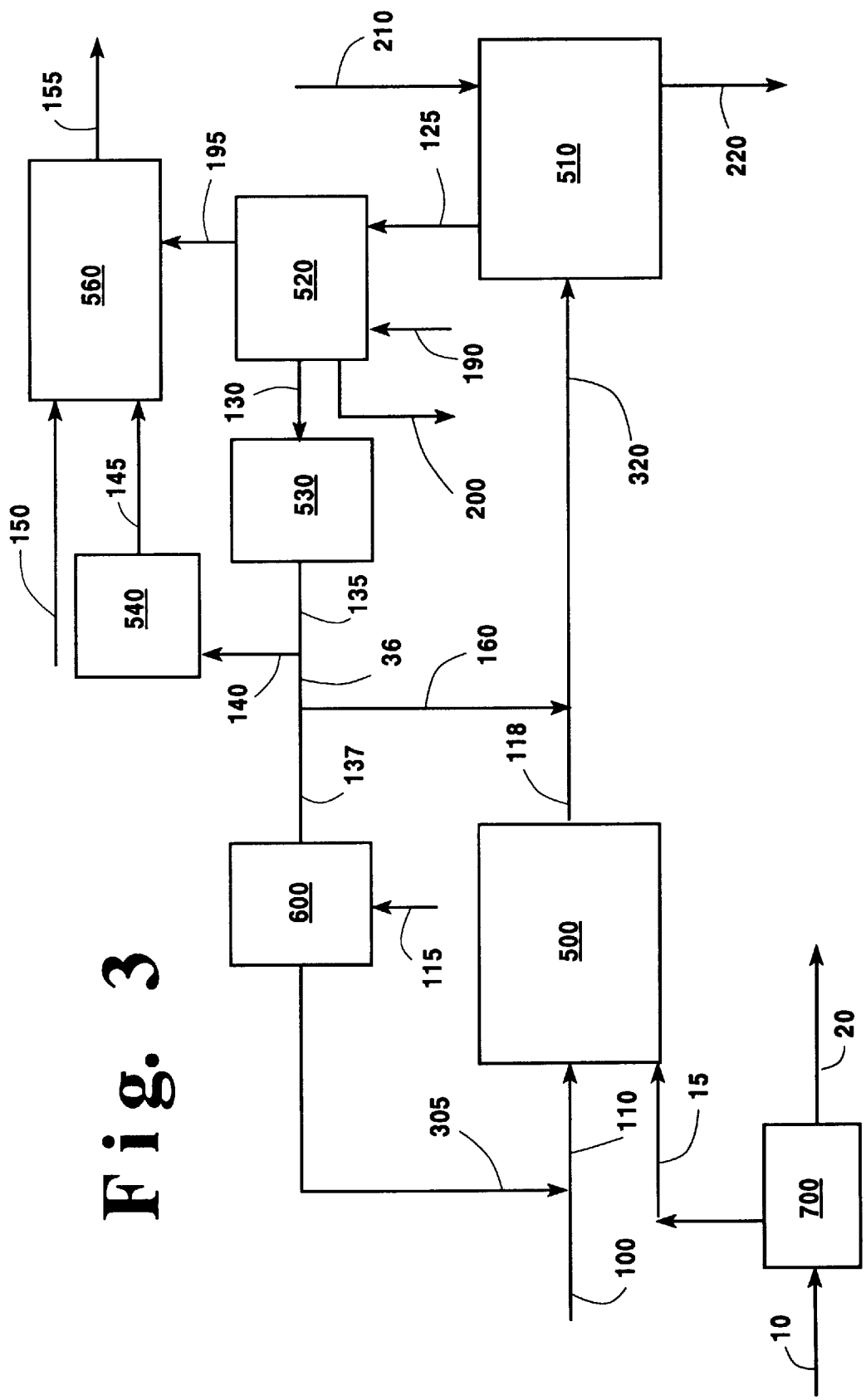
FIG. 3 is a flowsheet diagram of another preferred embodiment of the invention employing large quantities of off-gas recycle.

FIG. 3 illustrates a preferred embodiment of the invention wherein off-gas is recycled both upstream and downstream of the synthesis gas generator. The numerals in FIG. 3 are the same as those in the other Drawings for the common elements and those common elements will not be discussed again in detail.

Referring now to FIG. 3, compressed off-gas 135 is divided into portion 140 and portion 36. A first part 160 of portion 36 is recycled into the feed for direct reduction reactor vessel 510. A second portion 137 is passed into fired heater 600 along with fuel 115. Heated off-gas 305 from fired heater 600 is then passed into stream 100 and resulting combined stream 110 is passed into partial oxidation unit 500 wherein synthesis gas is generated. Hot syngas stream 118 from partial oxidation unit 500 is combined with off-gas recycle stream 160 to form stream 320 which is then fed into reactor vessel 510. The use of the fired heater optimizes the overall cost of the system. Preheating a portion of the recycle gas reduces the quantity of oxygen needed to sustain the endothermic reforming reactions in the partial oxidation unit.

Figure 4:
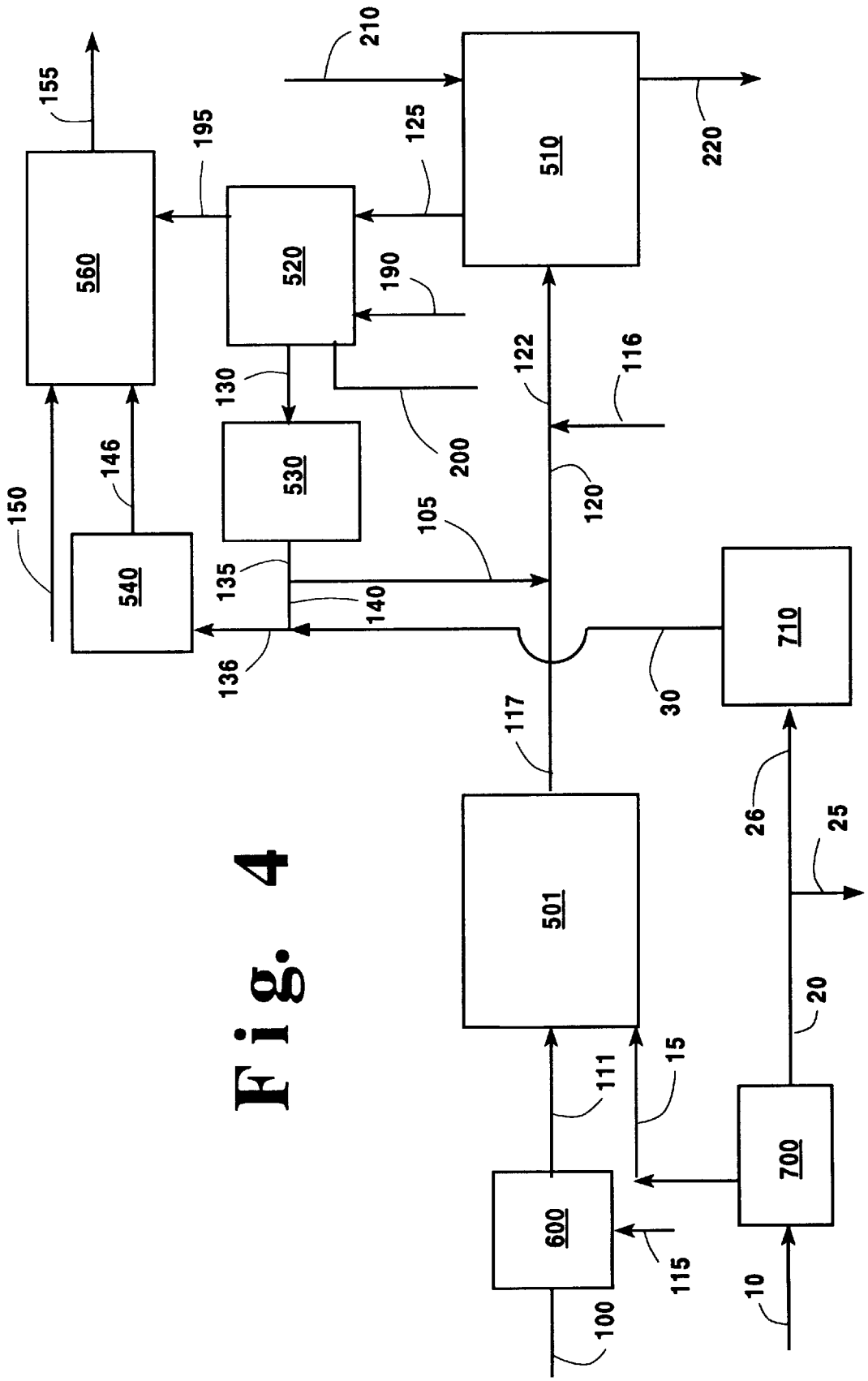
FIG. 4 is a flowsheet diagram of a preferred embodiment of the invention wherein both oxygen and nitrogen produced by the air separation plant are employed.

FIG. 4 illustrates a preferred embodiment of the invention wherein the synthesis gas generator is either a partial oxidation unit or an autothermal unit and the air separation plant is a cryogenic air separation plant. The numerals in FIG. 4 are the same as those in the other Drawings for the common elements, and these common elements will not be discussed again in detail.

Referring now to FIG. 4, hydrocarbon fluid 100 is passed into fired heater 600 along with fuel 115. Heated hydrocarbon fluid 111 from fired heater 600, and oxygen 15 produced in cryogenic air separation plant 700, are passed into synthesis gas generator 501 which can be either a partial oxidation unit or an autothermal unit. If synthesis gas generator 501 is an autothermal unit, steam is preferably added to hydrocarbon fluid 100 upstream of fired heater 600.

Drier off-gas 105 from first compressor 530 is combined with synthesis gas 117 from synthesis gas generator 501 to form synthesis gas stream 120. In the embodiment of the invention illustrated in FIG. 4, hydrocarbon-containing fuel 116 is added directly to hot synthesis gas 120 to form feed stream 122 to direct reduction reactor vessel 510. This takes advantage of some reforming in the hot synthesis gas stream and the ability of the direct iron reduction reaction to reduce the hydrocarbon to carbon and hydrogen. Because of the high temperature of streams 120 and 122 and the presence therein of carbon dioxide from recycle stream 105, some hydrocarbon reforming will occur in stream 122 prior to its entering reactor vessel 510. In reactor vessel 510 additional reforming will take place as well as cracking of the hydrocarbon to carbon and hydrogen. An advantage resulting from the addition of hydrocarbon fuel 116 to the synthesis gas feed to reactor vessel 510 is a reduction in the amount of synthesis gas that must be produced in synthesis gas generator 501 thus reducing its size as well as the size of the air separation plant. In addition, since the reforming reaction is endothermic, the quantity of recycle in stream 105 can be reduced while still providing for the desired inlet temperature to direct reduction reactor vessel 510.

In the embodiment of the invention illustrated in FIGS. 3 and 4, water 190 is provided to dryer 520 and vaporized by indirect heat exchange with hot off-gas 125 with the resulting steam 195 passed to turbine 560 for use to generate additional power.

The embodiment of the invention illustrated in FIG. 4 also employs nitrogen produced in air separation plant 700 in the gas turbine. While some nitrogen 25 from plant 700 may be recovered, at least some of the product nitrogen, generally having a nitrogen concentration of at least 95 mole percent, is passed in stream 26 to nitrogen compressor 710 wherein it is compressed to a pressure generally within the range of from 30 to 300 psia. Resulting compressed nitrogen stream 30 is then combined with drier off-gas stream 140 to form stream 136 which is then further compressed in second compressor 540 and then passed as stream 146 to turbine 560 for the generation of power. The nitrogen from the air separation plant serves two functions. The first is to reduce the flame temperature in the gas turbine combustor so as to reduce the level of nitrogen oxides (NOx) generated in the combustor. The second function of the nitrogen addition is for power augmentation. The additional mass associated with the nitrogen can be used to ensure that the gas turbine operates near its mechanical limit thus ensuring maximum utilization of the gas turbine capital.

Figure 5:
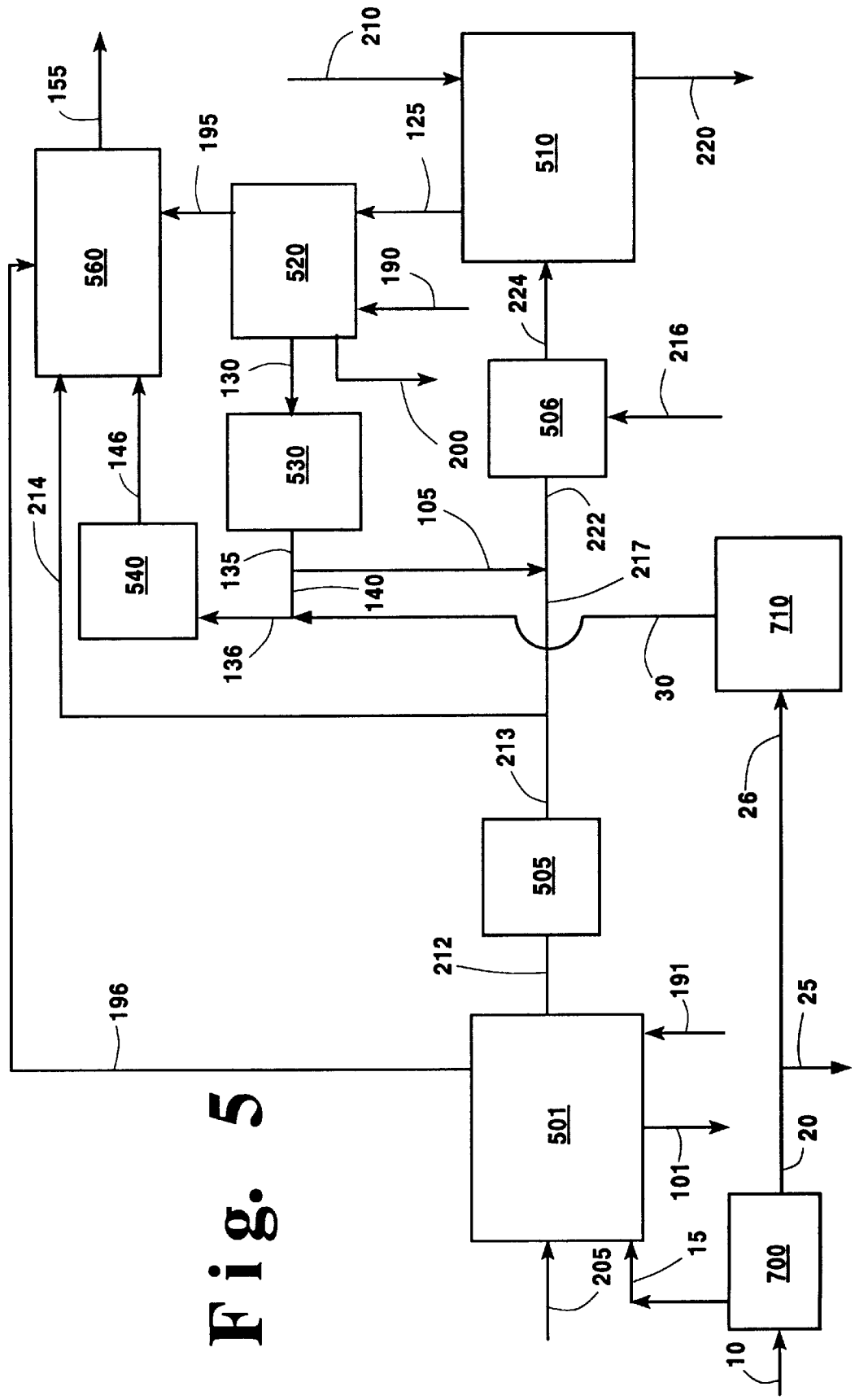
FIG. 5 is a flowsheet diagram of yet another embodiment of the invention wherein a solid or heavy liquid fuel is used to generate the synthesis gas.

FIG. 5 illustrates another Embodiment of the invention wherein the fuel used to generate the synthesis gas is solid and/or heavy liquid. The numerals in FIG. 5 are the same as those in the other Drawings for the common elements, and these common elements will not be discussed again in detail.

Referring now to FIG. 5, solid and/or heavy liquid fuel 205 such as coal, petroleum coke or residual oil is passed into partial oxidation unit 501 along with oxygen 15 and boiler feedwater 191. Synthesis gas stream 212 is withdrawn from unit 501 and, if desired, passed through sulfur removal unit 505 which may be a conventional absorption unit, an amine based system, or a high temperature unit. Slag is removed from unit 501 in stream 131 and steam is passed from unit 501 in stream 196 to turbine 560. Desulferized synthesis gas stream 213 is divided into stream 214, which is passed into turbine 560, and into stream 217, which is combined with recycle stream 105 to form stream 222. This stream is heated in fired heater 506 using fuel 216 and resulting stream :224 is passed into direct reduction reactor vessel 510 for processing as previously described.

Now by the use of this invention one can produce iron by the direct reduction of iron ore more effectively than with conventional systems. By product from the direct reduction is used to generate power and also may be used to reduce the amount of synthesis gas which must be generated to carry out the direct reduction. The generated power may be used, inter alia, to operate an air separation plant and the products of the air separation plant may be used for the generation of synthesis gas and also for NOx reduction and for power generation augmentation.

Although the invention has been described in detail with reference to certain preferred embodiments, those skilled in the art will recognize that there are other embodiments of the invention within the spirit and the scope of the claims.

What is claimed is:

1. A method for producing iron comprising:
   (A) generating synthesis gas by passing feed air into an air separation plant, separating the feed air in the separation plant to produce oxygen, and reacting oxygen from the air separation plant with hydrocarbon fluid to effect the said generation of the synthesis gas, and passing the synthesis gas into a reactor vessel;
   (B) providing iron ore into the reactor vessel and reacting the iron ore with the synthesis gas within the reactor vessel to produce iron and reactor off-gas comprising carbon monoxide, hydrogen, carbon dioxide and water vapor;
   (C) recovering iron from the reactor vessel;
   (D) removing at least some of the water vapor from the reactor off-gas to produce drier off-gas; and
   (E) combusting the drier off-gas in a gas turbine to produce power.

2. The method of claim 1 wherein a portion of the drier off-gas is recycled to the reactor vessel.

3. The method according to claim 1 further comprising using power from said gas turbine to operate said air separation plant.

4. The method of claim 1 further comprising producing nitrogen in the air separation plant and mixing nitrogen from the air separation plant with drier off-gas prior to the combustion of said drier off-gas.

5. The method of claim 1 wherein the synthesis gas is generated via at least one of a reforming reaction, a partial oxidation reaction and an autothermal reaction.

6. The method of claim 1 wherein synthesis gas is generated via both a reforming reaction and a partial oxidation reaction and synthesis gas from each of the reforming reaction and the partial oxidation reaction is passed into the reactor vessel.

7. Apparatus for producing iron comprising:
   (A) a synthesis gas generator, an air separation plant, means for passing feed air into the air separation plant, and means for passing oxygen from the air separation plant to the synthesis gas generator, and means for passing hydrocarbon fluid into the synthesis gas generator;

(B) a direct reduction reactor vessel, means for passing iron ore into the direct reduction reactor vessel, and means for passing synthesis gas from the synthesis gas generator into the direct reduction reactor vessel;

(C) means for recovering iron from The direct reduction reactor vessel;

(D) a dryer and means for passing gas from the direct reduction reactor vessel to the dryer; and (E) a gas turbine and means for passing gas from the dryer to the gas turbine.

8. The apparatus of claim 7 further comprising means for passing gas from the dryer to the direct reduction reactor vessel.

9. The apparatus according to claim 7 further comprising means for using power generated by said gas turbine to operate said air separation plant.

10. The apparatus of claim 7 further comprising means for passing nitrogen from the air separation plant to the gas turbine.

\* \* \* \* \*